(12) United States Patent
Booten et al.

(10) Patent No.: US 7,989,546 B2
(45) Date of Patent: Aug. 2, 2011

(54) NATURAL RUBBER LATEX PRESERVATION

(75) Inventors: Karl Booten, Geetbets (BE); Amir Hashim Bin Yatim, Selangor (MY); Manroshan Singh, Teluk Intan (MY)

(73) Assignee: Beneo-Orafti S.A. (BE)

( * ) Notice: Subject to any disclaimer, the term of this patent is extended or adjusted under 35 U.S.C. 154(b) by 0 days.

(21) Appl. No.: 12/530,434

(22) PCT Filed: Mar. 4, 2008

(86) PCT No.: PCT/EP2008/001697
§ 371 (c)(1),
(2), (4) Date: Mar. 2, 2010

(87) PCT Pub. No.: WO2008/107155
PCT Pub. Date: Sep. 12, 2008

(65) Prior Publication Data
US 2010/0204367 A1 Aug. 12, 2010

(30) Foreign Application Priority Data

Mar. 7, 2007 (EP) .................................... 07004651
Mar. 13, 2007 (EP) .................................... 07005128
May 15, 2007 (EP) .................................... 07009668

(51) Int. Cl.
*C08L 7/02* (2006.01)
(52) U.S. Cl. .................... 524/575.5; 524/571; 524/606; 524/612
(58) Field of Classification Search .................. 524/571, 524/575.5, 606, 607, 612
See application file for complete search history.

(56) References Cited

U.S. PATENT DOCUMENTS

| | | | |
|---|---|---|---|
| 3,120,498 A | 2/1964 | Matthaeus et al. | 260/2.5 |
| 3,645,940 A | 2/1972 | Stephens et al. | 260/17.4 |
| 4,585,858 A | 4/1986 | Molotsky | 536/4.1 |
| 5,610,212 A * | 3/1997 | Tanaka et al. | 524/156 |
| 5,773,499 A | 6/1998 | Umland et al. | 524/394 |
| 5,840,790 A | 11/1998 | Ong | 524/186 |
| 6,380,283 B1 | 4/2002 | Perrella et al. | 524/31 |
| 6,462,159 B1 | 10/2002 | Hamada et al. | 526/336 |
| 2004/0248761 A1 * | 12/2004 | Booten et al. | 510/470 |

FOREIGN PATENT DOCUMENTS

| | | |
|---|---|---|
| EP | 0624601 | 11/1994 |
| EP | 0630907 | 12/1994 |
| EP | 0638589 | 2/1995 |
| EP | 0703243 | 3/1996 |
| EP | 0792888 | 9/1997 |
| GB | 437758 | 11/1935 |
| GB | 601374 | 5/1948 |
| GB | 806935 | 1/1959 |
| GB | 1 293 176 | 10/1972 |
| GB | 2 011 933 | 7/1979 |
| GB | 2405872 | 3/2005 |
| JP | 3-197409 | 8/1991 |
| JP | 06-056906 | * 3/1994 |
| JP | 6056906 | 3/1994 |
| JP | 2004-027011 | * 1/2004 |
| WO | WO 99/64549 | 12/1999 |
| WO | WO 01/44303 | 6/2001 |
| WO | WO 03/031043 | 4/2003 |

OTHER PUBLICATIONS

Stevens C V et al: "Chemical Modification of Insulin, a Valuable Renewable Resource, and its Industrial Applications", Biomacromolecules, American Chemical Society, vol. 2, No. 1, 2001, pp. 1-16 (Abstract Only).

* cited by examiner

*Primary Examiner* — Ling-Siu Choi
(74) *Attorney, Agent, or Firm* — Hayes Soloway P.C.

(57) ABSTRACT

The Invention relates to a method for the preservation of natural rubber latex comprising the step of adding to natural latex at least one hydrophobically modified saccharide. The hydrophobically modified saccharide is preferably a hydrophobically modified fructan, a hydrophobically modified starch hydrolysate, or a mixture thereof. The invention further relates to a natural rubber latex containing a hydrophobically modified saccharide, and to vulcanized natural rubber products containing a hydrophobically modified saccharide.

18 Claims, No Drawings

NATURAL RUBBER LATEX PRESERVATION

The invention relates to a method for the preservation of natural rubber latex against coagulation and putrefaction, to a preserved natural rubber latex, and to natural rubber products so obtained.

Natural rubber is mainly produced from latex obtained from trees of the genus *Hevea*. The sap (also termed latex) flowing from cuts made in the *Hevea* trees is collected and pooled for further processing. The latex and the pooled latex are commonly named natural rubber latex. The latex is a colloidal dispersion of rubber particles in an aqueous medium, containing usually from about 20 to about 40% w/w, typically about 25-35% w/w, rubber particles (dry rubber) and about 5% w/w non-rubber compounds, including carbohydrates, proteins, phospholipids and metal salts. The term w/w has herein the common meaning of weight on total weight or on total weight of a specifically indicated fraction.

Fresh natural rubber latex spontaneously coagulates within a few hours from its collection from the trees, a process which is non-desired because it renders further handling of the latex, such as pooling, transportation, storage and further processing, more difficult or hardly possible and hence economically non-attractive.

Spontaneous coagulation is commonly assumed to result from a microbial infection of the fresh rubber latex during its collection and handling. The time period to come to coagulation varies for different latex samples and depends from the importance of the microbial infection, the ambient temperature which influences the growth of the micro-organisms, and the colloidal stability of the latex.

Spontaneous coagulation is presumed to occur by one or more of the following mechanisms, namely: (i) that as a result of microbial growth with interaction, including fermentation, with non-rubber components of the latex, various acidic substances are formed, particularly volatile fatty acids, which decreases the pH of the latex and which in turn decreases the stability of the colloidal dispersion and leads to coagulation; and/or (ii) that as a result of the hydrolysis of various non-rubber substances of the latex provoked by microbial growth and/or by enzymes present in the latex, fatty acid anions are liberated that are adsorbed on the surface of the colloidal rubber particles or that may displace proteins adsorbed on the surface of said particles, and that furthermore a decrease of the pH of the latex provoked by the generated acidic compounds reduces the number of carboxyl anions on the surface of the rubber colloidal particles, which in turn reduces the electrostatic repulsion between the colloidal particles and hence reduces the stability of the colloidal latex dispersion; and/or (iii) that the colloidal rubber particles with fatty acid anionic groups adsorbed on their surface interact with calcium and magnesium ions that are present in the latex thus reducing the number of carboxyl anions, which in turn leads to a decrease of the stability of the colloidal dispersion. The decrease of the colloidal stability will eventually lead to the coagulation of the colloidal rubber particles as a result of which the latex dispersion separates into a coagulated rubber phase (mainly containing clots of rubber particles) and an aqueous phase.

Furthermore, microbial infection involving fermentation with the generation of acids, as well as acidic and enzymatic hydrolysis of various substances present in the latex, are also provoking putrefaction. Due to putrefaction, not only bad odours are generated but also acids, which leads to a decrease of the pH of the latex, which in turn leads to a decrease of the colloidal stability of the latex and eventually results in coagulation of the colloidal rubber particles of the latex.

For technical and economical reasons fresh natural rubber latex is mostly concentrated in view of its storing and further handling. Most of the collected fresh natural rubber latex is concentrated by centrifugation and the remainder is concentrated by creaming.

In the centrifugation process, the latex, containing rubber particles which have a density less than the aqueous medium, is subjected to centrifugal forces as a result of which the latex separates into a layer containing mainly the rubber colloidal particles (cream layer) and into an aqueous layer (skim layer). The cream layer is then separated from the skim layer by conventional techniques.

In the creaming process, the latex is allowed to stand for several hours during which, under the effect of gravitational forces, the rubber colloidal particles, having a density less than the aqueous medium, rise to the top of the latex dispersion, forming a cream layer. The cream layer (in short "cream") is then conventionally separated from the lower, aqueous layer (skim), and optionally the cream layer can be subjected to an additional centrifugation step.

As a result of the concentration via centrifugation or via creaming, with an optionally additional centrifugation step, the total solids content of the colloidal latex dispersion constituted by the cream layer is raised from about 30% w/w to about 60-67% w/w, and its dry rubber content is raised to about 55-65% w/w, typically to about 60% w/w.

To avoid problems associated with a non-desired coagulation of the natural rubber latex during the collection, pooling, concentration by centrifugation or by creaming, or during bulking and storing of the concentrated latex, as well as to avoid putrefaction, important research efforts have already been made to develop methods for preserving natural rubber latex.

By preserving is meant herein the physical and/or chemical stabilization of the natural rubber latex against coagulation of the colloidal rubber particles, as well as the stabilization against microbial growth and putrefaction. The above definition also applies to the term preservation and to the generic term stabilization.

Furthermore, often the term bacterial/bacteriological is used in the art instead of the term microbial/micro-biological (referring i.a. to bacteria, yeasts, and fungi), and these terms are used, also herein, interchangeably. Also the related terms biocide, bactericide, sporocide, biostatica and bacteriostatica are often used in the art, and also herein, interchangeably.

On the one hand various bactericides have been disclosed which at a concentration, depending on the nature of the bactericide, typically ranging from 0.005% w/w to 5% w/w on total latex, effectively inhibit bacterial growth in fresh natural rubber latex. Hence the formation of acidic compounds resulting from bacterial activity in the latex is inhibited or even avoided, which in turn inhibits or avoids coagulation.

On the other hand, compounds have been utilised which, by raising the pH of the latex, maintain the acidic functional groups of the compounds adsorbed at the surface of the colloidal rubber particles into the anionic form, thus maintaining electrostatic repulsion between said colloidal particles and hence ensuring physico-chemical stabilization of the colloidal rubber latex dispersion.

Furthermore, methods for the preservation of natural rubber latex have been developed based on a combination of both approaches, namely methods wherein the pH of the latex is increased and also a bactericide is added to the latex.

To stabilize colloidal natural rubber latex dispersions at industrial scale, commonly the pH of the latex is increased. Though alkali hydroxides can be used to do so, much better results are obtained by using ammonia. Ammonia enables to increase in a technically convenient and economical manner the pH to a value of least 8 and higher, thus generating the anionic form of the acidic groups at the surface of the colloidal rubber particles and hence ensuring electrostatic repulsion between said colloidal rubber particles. Furthermore, ammonia also largely neutralizes the undesirable effects of trace metal ions, particularly calcium and magnesium ions, which are normally present in natural rubber latex. In the absence of ammonia, these ions tend to reduce the amount of said acidic groups in the anionic form by forming with them calcium and magnesium salts, hence reducing the stability of the colloidal latex dispersion.

Moreover, ammonia has been found to provide a strong bactericidal effect at a level of at least 0.35% w/w on total latex.

Accordingly, the addition of ammonia has become the most common method to preserve natural rubber latex. Typically, high concentrations of ammonia (minimum about 0.7% w/w on total latex) are used to prevent coagulation and putrefaction and to ensure long-term preservation of the latex. Natural rubber latex preserved in such manner is commonly named high-ammonia (HA) preservate or HA latex.

However, the use of ammonia also presents several disadvantages, including a gradual fall of the pH of the rubber latex dispersion during storage over a period of time. Accordingly, the use of an excess of ammonia in the beginning of the preservation period or repeated additions of ammonia over the preservation period are required to keep the pH at the desired value over a certain period of time. Furthermore, there are also health hazards associated with the manipulation of ammonia resulting from the inhalation of ammonia vapours and skin contact with concentrated aqueous solutions, for example when ammonia is added to fresh latex as a preservative. A further considerable disadvantage arises from the liberation of ammonia vapours when ammoniated latex is centrifuged or when in the creaming process, the cream is separated from the skim. These vapours are highly irritating, hinder the workers, and may create serious health hazards for people working in the vicinity of the centrifuge or creamer in plants. Furthermore, the ammonia vapours are corrosive and may adversely affect plant equipment and factory buildings.

To overcome or reduce the disadvantages of the utilisation of ammonia at high concentration, several methods to preserve natural rubber latex have already been developed which are based on the use of a reduced amount of ammonia in combination with a bactericide. According to these methods, the concentration of ammonia is typically reduced to about 0.2% w/w on total latex and at least one bactericide is added at a concentration typically ranging from 0.005% w/w to about 1% w/w on total latex. Natural rubber latex preserved in such manner is commonly named low-ammonia (LA) preservate or LA latex.

Typical bactericides include formaldehyde, sodium sulphite, zinc oxide, dialkyldithiocarbamates and tetraalkylthiuram sulphides.

Also variants to the above methods for the preservation of natural rubber latex have already been developed wherein ammonia has been partly or completely substituted by an organic amine or by urea.

GB 1293176 discloses a method for preserving natural rubber latex from coagulation, comprising rising and maintaining the pH of the latex at a value of at least 8, preferably 8.5 to 9.5, by repeated addition thereto of a nitrogenous base, being ammonia or an organic amine, or by a single or repeated addition of urea, or by a combination of both. The preservative is added at a concentration depending on the period the latex has to be kept fluid. The total amount of ammonia that is incrementally added varies from sample to sample and typically ranges from 0.3% to 0.5% w/w on total latex. The addition of 0.5% to 2.0% w/w on total latex of urea makes further additions of ammonia after an initial pH adjustment unnecessary.

U.S. Pat. No. 5,840,790 discloses a preservative system for natural rubber latex comprising the addition to natural rubber latex of ammonia or at least one primary aliphatic amine, typically in an amount of 0.1% to 0.5% w/w on total latex, and at least one bactericide, such as tetramethylthiuram sulphide (TMTD) or zinc oxide, or a 1:2 to 2:1 mixture of TMTD and zinc oxide in aqueous dispersion, in an amount of 0.02% to 0.05% w/w on total latex. Suitable amines include ethanolamine, ethylamine, isopropanolamine, ethylenediamine and diethylenetriamine.

GB 2011933 discloses a method for the preservation of field (fresh) natural rubber latex comprising adding to the latex a non-ionic surfactant having a hydrophilic-lipophilic balance value of at least 12, either alone or in combination with small amounts of ammonia. When used alone, the non-ionic surfactant, being an ethoxylated derivative of a fatty alcohol, of an alkylphenol or of a long-chain alkylamine, is used in an amount of 0.1% to 3% w/w on dry rubber content of the latex, corresponding to about 0.03% to 1% surfactant on total fresh latex. When used in combination with ammonia in an amount of up to 0.15% w/w on total latex, the surfactant is used in an amount of 0.1% to 1% w/w on dry rubber content, corresponding to about 0.03% to 0.3% w/w surfactant on total latex.

Although several methods have already been developed for the short-term and long-term preservation of fresh natural rubber latex, many of these methods still suffer from one or more disadvantages or drawbacks, such as, for example, a high concentration of ammonia, a high concentration of bactericide, and undesirable effects caused by the bactericide remaining in the rubber on the properties of the shaped rubber articles produced from said rubber.

Accordingly, there still remains a need for improved as well as for alternative methods for the preservation of natural rubber latex which preferably do not suffer from one or more disadvantages present in prior art methods.

One objective of the present invention is the provision of an alternative or an improved method for the preservation of natural rubber latex.

Said objective is achieved in that the method comprises adding to natural rubber latex at least one hydrophobically modified saccharide.

An advantage of the method according to the invention is that the addition to fresh natural rubber latex of a hydrophobically modified saccharide—possibly in combination with a further preservative—significantly increases the physicochemical stability of the latex (the mechanical stability as well as the colloidal stability), and also increases the stabilization against putrefaction. This method for the preservation of natural rubber latex has the advantage that it is an economically interesting method which does not negatively affect subsequent conventional processing of the latex or the properties of shaped rubber articles manufactured from the stabilized latex.

By natural rubber latex (abbreviated NR latex) is meant herein rubber latex (freshly) collected from trees, particularly *Hevea* trees, as well as non-concentrated pooled NR latex and NR latex that has been concentrated by a conventional technique, but that have not been subjected to a preservation treatment. Natural rubber latex that has been subjected to a preservation treatment is named herein stabilized rubber latex or preserved rubber latex.

By preservation is meant herein the physico-chemical stabilization of the rubber latex against coagulation of the colloidal rubber particles (including the mechanical stabilization, i.e. the stability of the colloidal latex dispersion when it is subjected to mechanical forces, such as centrifugation, as well as the colloidal stabilization, i.e. the stability of the colloidal latex dispersion when it is subjected to chemicals, such as acids, which reduce the electrostatic repulsion and/or steric repulsion between the colloidal particles), as well as the stabilization against microbial growth and putrefaction of the latex (also named microbiological stabilization). This definition also applies to the term stabilization which is used herein interchangeably with the term preservation.

By preservative is meant herein a compound or a composition that stabilizes natural rubber latex, for example by increasing the pH of the latex, and/or by providing biocidal, bactericidal, sporocidal, biostatic and bacteriostatic effects to the latex.

According to a preferred embodiment of the invention, a method for the preservation of natural rubber latex is provided which comprises adding to natural rubber latex in total from 0.05% to 3%, preferably from 0.20% to 1.50% w/w on dry rubber of at least one hydrophobically modified saccharide. The concentrations of the hydrophobically modified saccharide in the method of the invention are indicated herein as weight percent of the amount of dry rubber in the latex.

The hydrophobically modified saccharide suitable according to the present invention is preferably a hydrophobically modified fructan, a hydrophobically modified starch hydrolysate, or a mixture thereof.

The term fructan as used herein has its common meaning of being a generic term that relates to a carbohydrate material consisting mainly of fructosyl-fructose links with optionally a glucose starting moiety. The meaning of fructan encompasses the more specific compounds inulin—wherein the fructosyl-fructose links are mainly of the $\beta(2\to1)$ type—and levan—wherein the fructosyl-fructose links are mainly of the $\beta(2\to6)$ type. Both inulins and levans can be linear or branched.

The hydrophobically modified saccharide suitable according to the present invention is preferably a carbamate, ester or ether of inulin, respectively maltodextrin, preferably as defined in the embodiments as provided below.

As meant herein, the addition of a hydrophobically modified saccharide can mean the addition of one compound, or it can mean the addition of a mixture of various hydrophobically modified saccharides.

The hydrophobically modified saccharide suitable in accordance with the present invention can preferably be a substituted polymeric saccharide of formula (I):

$$S_{AC}(-M)_s \qquad (I)$$

wherein $S_{AC}$ represents:
(i) an inulin moiety with a degree of polymerisation (DP) ranging from 3 to 100, or
(ii) a starch hydrolysate moiety with a dextrose equivalent (D.E.) value ranging from 2 to 47;

(-M) represents a hydrophobic moiety, substituting at least one hydrogen atom of a hydroxyl group of $S_{AC}$, whereby (-M) is selected from the group consisting of:
an alkylcarbamoyl radical of formula $R^1$—NH—CO—,
an alkenyl-carbamoyl radical of formula $R^2$—NH—CO—,
an alkylcarbonyl radical of formula $R^1$—CO—,
an alkenylcarbonyl radical of formula $R^2$—CO—,
an alkyl radical of formula $R^1$—,
an alkenyl radical of formula $R^2$—, and
a hydroxyalkyl radical of formula $R^3$—, wherein:
$R^1$ represents a linear or branched alkyl group with 4 to 22 carbon atoms,
$R^2$ represents a linear or branched alkenyl group with 4 to 22 carbon atoms,
$R^3$ represents a linear or branched hydroxyalkyl group with 4 to 22 carbon atoms of formula —CHR'—CHOH—R", wherein R' is hydrogen or a linear or branched alkyl radical containing 2 to 20 carbon atoms; and R" is a linear or branched alkyl radical containing 2 to 20 carbon atoms;

s represents the number of hydrophobic moieties (-M) attached to $S_{AC}$, expressed as the number average degree of substitution (av. DS) per individual fructosyl and/or glucosyl unit and ranging from 0.01 to 2.0.

In the inulin derivatives and starch hydrolysate derivatives of formula (I), preferably the radical $R^3$— is a 2-hydroxyalkyl group containing 4 to 22 carbon atoms, more preferably the radicals $R^1$—, $R^2$—, and $R^3$— are, respectively, an alkyl, alkenyl and 2-hydroxyalkyl group containing 6 to 22 carbon atoms, more preferably containing from 6 to 18 carbon atoms, even more preferably containing from 8 to 18 carbon atoms. Preferably said alkyl, alkenyl and 2-hydroxy-alkyl groups are linear groups.

Those substituted polymeric saccharide of formula (I) wherein $S_{AC}$ represents an inulin moiety can favourably be derived from inulin by substitution of inulin with one or more hydrophobic moieties (-M).

Inulin is well known in the art and concerns saccharide molecules consisting of fructosyl units, mainly bound to one another by $\beta(2\to1)$ fructosyl-fructosyl bounds and possibly having a terminal glucosyl unit. Inulin molecules are generally represented by formula $GF_m$ and formula $F_{m'}$, wherein G represents a terminal glucosyl unit, F a fructosyl unit, and m and m' are an integer representing the number of F units in the saccharide molecule, m+1, respectively m', being termed the degree of polymerisation (DP).

The inulin moiety of formula can herein be represented by formula $[A]_n$ whereby n represents the DP. The moiety inulin is derived from inulin having a DP ranging from 3 to 100, which can be inulin of natural origin, namely inulin from a plant or bacterial source, partially hydrolysed inulin from plant or bacterial origin, as well as oligofructose of natural origin and oligofructose produced by enzymatic synthesis. The wording 'derived from' is indicative of the fact that the inulin moieties $[A]_n$ are chemically different from inulin as such due to the substitution of at least one hydrogen atom of a hydroxyl group of inulin by (-M). Oligofructose as meant herein is inulin of formula $GF_m$ and/or $F_{m'}$ with a DP ranging from 2 to 9.

Inulin that is suitable in accordance with the present invention can be homodisperse or polydisperse and can be linear as well as branched, preferably having a degree of branching that is below 25%, as well as a mixture of linear and branched inulin.

Preferred inulin derivatives of formula (I) are those derived from chicory inulin, being polydisperse inulin with a DP ranging from 3 to about 70 and an av. DP ranging from 10 to 17. Even more preferred are derivatives of formula (I) derived from chicory inulin from which most monomeric and dimeric saccharide side products as well as most inulin molecules with a DP from 3 to 9 have been removed, and which typically has an av. DP ranging from 20 to 30, more typically from 23 to 27.

Commercial grades of inulin, for example available from Orafti, Belgium, are also suitable for the manufacture of the inulin derivatives of formula (I).

Those substituted polymeric saccharide of formula (1) wherein the SAC moiety represents a start hydrolysate moiety—which can herein be represented by formula [B]—is derived from a starch hydrolysate—preferably having a D.E. from 2 to 47—by substitution with one or more hydrophobic moieties (-M). Starch hydrolysates are well known in the art. They are prepared by conventional processes, for example by acidic or enzymatic partial hydrolysis, from various starch sources, for example corn, potato, tapioca, rice, sorghum and wheat, and are commercially available in various grades.

Starch hydrolysate molecules have reducing power due to a terminal glucosyl unit. The more the hydrolysis of a given starch has proceeded, the more oligomeric molecules with a terminal glucosyl unit are present in the hydrolysate, and thus the higher the reducing power of the hydrolysate. The reducing power is expressed, on dry product basis, in dextrose equivalent (D.E.), D-glucose having per definition a D.E. of 100. The D.E. value is a measure for the extent of the hydrolysis of the starch and thus also a relative indication of the average molecular weight and the average degree of polymerisation of the polyglucose (saccharide) molecules of the hydrolysate. Starch hydrolysates are usually defined by their D.E. value and sometimes additionally by the source of the starch and/or the method of manufacture of the hydrolysate. Starch hydrolysates range from a product essentially composed of glucose, over products with a D.E. greater than 20 (commonly named glucose syrup but also regularly named maltodextrin), to products with a D.E. of 20 or less (commonly named maltodextrin or dextrin). Starch hydrolysates are commonly composed of a polydisperse mixture of linear or branched polyglucose molecules, or any mixture thereof.

Starch hydrolysates that are preferred for the preparation of the starch hydrolysate moiety of the hydrophobically modified saccharides of formula (I) above, are commercial grade compounds, typically polydisperse mixtures of linear and/or branched polyglucose molecules, having a D.E. ranging from 2 to 47, preferably from 2 to 30, more preferably from 2 to 19. Such starch hydrolysates are commercially available from for example Roquette Frères, France.

Inulin derivatives as well as starch hydrolysate derivatives of formula (I) wherein (-M) represents an alkylcarbamoyl radical of formula $R^1$—NH—CO—, or an alkenylcarbamoyl radical of formula $R^2$—NH—CO—, wherein $R^1$ and $R^2$ represent a linear or branched alkyl group, respectively alkenyl group, with 4 to 22 carbon atoms, are known in the art, and for example disclosed in WO 99/064549 and WO 01/44303. They can be conventionally prepared by reaction of inulin, respectively a starch hydrolysate, with an alkylisocyanate or alkenylisocyanate of respectively formula $R^1$—N=C=O and $R^2$—N=C=O wherein $R^1$ and $R^2$ have the meanings defined above.

A typically suitable inulin derivative of formula (I) is for example inulin laurylcarbamate which is commercially available as Inutec® SP1 (trade name) from Orafti, Belgium.

A typically suitable starch hydrolysate derivative of formula (I) is for example a carbamate derived from a starch hydrolysate having a D.E. value from 2 to 19 wherein the $R^1$ alkyl group of the alkylcarbamoyl radical or the $R^2$ alkenyl group of the alkenylcarbamoyl radical is a linear group containing from 8 to 18 carbon atoms.

Inulin derivatives and starch hydrolysate derivatives of formula (I) wherein (-M) represents an alkylcarbonyl radical of formula $R^1$—CO— or an alkenylcarbonyl radical of formula $R^2$—CO—, wherein $R^1$ and $R^2$ represent a linear or branched alkyl, respectively alkenyl group with 4 to 22 carbon atoms, are known in the art and can be prepared by conventional esterification reactions, for example by reaction of inulin, respectively a starch hydrolysate, with an anhydride of formula $R^4$—CO—O—CO—$R^4$ or $R^4$—CO—O—CO—$CH_3$, or an acid chloride of formula $R^4$—CO—Cl (wherein $R^4$ represents respectively a radical $R^1$ or $R^2$ having the meanings given above). Such esterification reactions, inulin derivatives and starch hydrolysate derivatives, are for example disclosed in EP 0792888, EP 0703243, GB 601374, GB 806935 and JP 3-197409.

Inulin derivatives and starch hydrolysate derivatives of formula (I) wherein (-M) represents an alkyl radical of formula $R^1$—, or a 2-hydroxyalkyl or an alkenyl radical of formula $R^2$, $R^1$ and $R^2$ being defined above, are known in the art. They can be prepared by conventional etherification or alkylation reactions, for example by reaction, in the presence of a base, of inulin, respectively a starch hydrolysate, with an alkyl halide of formula $R^1$—X, or an alkenyl halide of formula $R^2$—X, or an alkyl sulphate of formula $R^1$—O—$SO_2$-0-$R^1$, or an alkenyl sulphate of formula $R^2$—O—$SO_2$—O—$R^2$, wherein $R^1$ and $R^2$ have the meanings defined above and X represents a chloride, bromide or iodide anion, or an other leaving group. Such alkylation reactions, said inulin derivatives and starch hydrolysate derivatives are disclosed in for example GB 601374 and GB 806935.

Inulin derivatives and starch hydrolysate derivatives of formula (I) wherein (-M) represents a hydroxyalkyl radical, preferably a 2-hydroxyalkyl radical, of formula $R^3$ ($R^3$ being defined above), are also known in the art and can be conventionally prepared, for example by reaction of inulin, respectively a starch hydrolysate, in the presence of an alkaline catalyst, with a linear or branched epoxyalkane, preferably a 1,2-epoxyalkane containing from 4 to 22 carbon atoms, as for example disclosed in EP 0638589, GB 601374 and U.S. Pat. No. 4,585,858.

The saccharide moieties of the inulin and starch hydrolysate derivatives according to formula (I), can be substituted by one or more alkylcarbamoyl moieties of formula $R^1$—NH—CO—, alkenylcarbamoyl moieties of formula $R^2$—NH—CO—, alkylcarbonyl moieties of formula $R^1$—CO—, alkenylcarbonyl moieties of formula $R^2$—CO—, alkyl moieties of formula $R^1$—, alkenyl moieties of formula $R^2$—, or hydroxyalkyl moieties of formula $R^3$, ($R^1$, $R^2$ and $R^3$ being defined above), in which all $R^1$ groups, respectively all $R^2$ and all $R^3$ groups, can be the same or different, or by any combination thereof.

The value of 's'—i.e. the av. DS of the derivatives of formula (I)—may range from 0.01 to 2, and preferably ranges from 0.02 to 1.0, more preferably from 0.05 to 0.5, most preferably from 0.1 to 0.3.

Some of the hydrophobically modified saccharides of formula (I) are as such known, and disclosed in for example in WO 99/64549, WO 01/44303, WO 03/031043, EP 0792888, and EP 0638589. Typical examples of hydrophobically modified saccharides of formula (I) that are suitable in accordance with the present invention are listed in Table 1 below.

TABLE 1

Hydrophobically modified saccharides of formula (I)

| Nr. | Lab ref. | SAC moiety | Type | M | R— | av. DS |
|---|---|---|---|---|---|---|
| 1 | MP 79 | $[A]_n$ | a | R—NH—CO | $CH_3(CH_2)_7$— | 0.02 |
| 2 | AM 150 | $[A]_n$ | a | R—NH—CO | $CH_3(CH_2)_7$— | 0.08 |
| 3 | AM 149 | $[A]_n$ | a | R—NH—CO | $CH_3(CH_2)_7$— | 0.09 |
| 4 | AM 154 | $[A]_n$ | a | R—NH—CO | $CH_3(CH_2)_7$— | 0.2 |
| 5 | AM 238 | $[A]_n$ | a | R—NH—CO | $CH_3(CH_2)_{11}$— | 0.07 |
| 6 | AM 219 | $[A]_n$ | a | R—NH—CO | $CH_3(CH_2)_{11}$— | 0.09 |
| 7 | AM 259 | $[A]_n$ | a | R—NH—CO | $CH_3(CH_2)_{11}$— | 0.1 |
| 8 | MP 28 | $[A]_n$ | a | R—NH—CO | $CH_3(CH_2)_{11}$— | 0.1 |
| 9 | MP 73 | $[A]_n$ | a | R—NH—CO | $CH_3(CH_2)_{11}$— | 0.1 |
| 10 | MP 66b | $[A]_n$ | a | R—NH—CO | $CH_3(CH_2)_{11}$— | 0.12 |
| 11 | AM 220b | $[A]_n$ | a | R—NH—CO | $CH_3(CH_2)_{11}$— | 0.15 |
| 12 | AM 82 | $[A]_n$ | a | R—NH—CO | $CH_3(CH_2)_{11}$— | 0.21 |
| 13 | MP 20 | $[A]_n$ | a | R—NH—CO | $CH_3(CH_2)_{11}$— | 0.3 |
| 14 | MP 32 | $[A]_n$ | a | R—NH—CO | $CH_3(CH_2)_{15}$— | 0.21 |
| 15 | MP 78 | $[A]_n$ | a | R—NH—CO | $CH_3(CH_2)_{17}$— | 0.023 |
| 16 | AM 22 | $[A]_n$ | a | R—NH—CO | $CH_3(CH_2)_{17}$— | 0.054 |
| 17 | MP 80 | $[A]_n$ | a | R—NH—CO | $CH_3(CH_2)_{17}$— | 0.11 |
| 18 | AM 244 | $[A]_n$ | b | R—NH—CO | $CH_3(CH_2)_{11}$— | 0.3 |
| 19 | MP 36 | $[A]_n$ | a | R—CO | $CH_3(CH_2)_{10}$— | 0.12 |
| 20 | MP 41 | $[A]_n$ | a | R—CO | $CH_3(CH_2)_{14}$— | 0.1 |
| 21 | MP 40 | $[A]_n$ | a | R—CO | $CH_3(CH_2)_7CH=CH—(CH_2)_7$— | 0.05 |
| 22 | MP 42 | $[A]_n$ | a | R—CO | $CH_3(CH_2)_{16}$— | 0.11 |
| 23 | AM 141 | [B] | d | R—NH—CO | $CH_3(CH_2)_{11}$— | 0.05 |
| 24 | AM 117 | [B] | e | R—NH—CO | $CH_3(CH_2)_{11}$— | 0.1 |
| 25 | PC 17 | [B] | c | R—NH—CO | $CH_3(CH_2)_{11}$— | 0.1 |
| 26 | PC 16 | [B] | d | R—NH—CO | $CH_3(CH_2)_{11}$— | 0.18 |
| 27 | MP 98 | [B] | d | R—CO | $CH_3(CH_2)_{10}$— | 0.1 |
| 28 | AM 70 | $[A]_n$ | a | R—NH—CO | $CH_3(CH_2)_7$— | 0.11 |
| 29 | MP 31 | $[A]_n$ | a | R—NH—CO | $CH_3(CH_2)_{15}$— | 0.12 |
| 30 | MP 92B | $[A]_n$ | f | R—NH—CO | $CH_3(CH_2)_{11}$— | 0.19 |
| 31 | MP 102 | $[A]_n$ | f | R—NH—CO | $CH_3(CH_2)_{11}$— | 0.13 |

Legend to Table 1
a = Inulin, av. DP 23 (RAFTILINE ® HP, ORAFTI, Belgium)
b = Inulin, DP mainly between 2 and 8, av. DP about 4.5 (RAFTILOSE ® P95, ORAFTI, Belgium)
c = Maltodextrin, DE 2 (Roquette, France)
d = Maltodextrin, DE 28 (Roquette, France)
e = Maltodextrin, DE 47 (Roquette, France)
f = Inulin, av. DP 13 (RAFTILINE ® ST, ORAFTI, Belgium)

In a preferred embodiment of the invention, at least one further preservative is added to the natural rubber latex besides the hydrophobically modified saccharide. The further preservative can be a compound already known to be suitable as preservative in natural rubber latex, and may be added in an amount ranging from about 0.001% to about 1%, preferably from 0.05 to 0.35% w/w on total latex. The concentrations of the further preservative in the method of the invention are indicated herein on the basis of non-concentrated natural rubber latex. The further preservative is preferably a compound or mixture of two or more compounds, optionally provided in the form of a composition; preferably the further preservative is selected from the group consisting of ammonia, aliphatic amines, particularly primary aliphatic amines, alkanolamines, particularly primary alkanolamines, urea, formaldehyde, sodium sulphite, tetraalkylthiuram disulphides, dialkyldithiocarbamates, and zinc oxide. Preferred preservatives include ammonia, ethylamine, ethyldiamine, diethyltriamine, ethanolamine, isopropanol-amine, urea, tetramethylthiuram disulphide (TMTD), and ammonium, sodium and zinc dimethyldithiocarbamate, and any mixtures thereof.

The method according to the invention can be carried out by adding to natural rubber latex, typically to freshly collected or freshly collected and pooled natural rubber latex (the term 'fresh' herein meaning within 3 hours, preferably within 1 hour, from the collection), an amount as indicated above of a hydrophobically modified saccharide—for example, a compound of formula (I). Preferably according to the invention, a further preservative in an amount as indicated above is added too.

It is a further object of the invention to provide a non-concentrated natural rubber latex as well as concentrated natural rubber latex (cream) that may be obtained by said preservation method detailed above.

The actual adding of the hydrophobically modified saccharide and optionally the further preservative can be done by means known to the skilled person, for example adding while the latex is stirred, or stirred subsequently, to ensure homogenisation. If both a hydrophobically modified saccharide and a further preservative are added, they may be simultaneously or subsequently, the order of addition in the latter variant being not critical.

Preferably the amount of hydrophobically modified saccharide used in said method ranges from 0.25% to 1.25, more preferably from 0.25% to 1.0% w/w on total amount of dry rubber, optionally in combination with an amount of further preservative ranging from 0.001% to 0.35% w/w on total amount of latex, preferably from 0.01% to 0.35% w/w, more preferably from 0.10% to 0.35%, even more preferably from 0.15% to 0.35% w/w.

In a further embodiment of executing the method of the invention, the rubber latex flowing from the cuts in the trees is collected or pooled in a container already containing a hydrophobically modified saccharide and optionally a further preservative in aqueous medium, the mixture then being stirred to ensure homogenisation. If both a hydrophobically modified saccharide, such as a compound according to formula (I), and a further preservative are used according to the invention, the container may contain already one component of said combination and is then subsequently treated with the desired amount of the second component.

In a further variant, the method according to the present invention, comprises the addition to natural rubber latex of two or more hydrophobically modified saccharides—such as for example two or more derivatives of formula (I)—and optionally one or two or more further preservatives to stabilize the natural rubber latex, with the understanding that the sum of the amounts of respectively the hydrophobically modified saccharide—and of the optional further preservatives—preferably comply with the respective total amounts indicated above, being preferably respectively from 0.20% to 1.50% w/w on dry rubber and from 0.001% to 0.35% on total latex.

In still a further variant of the method according to the invention, natural rubber latex or pooled natural rubber latex that first has been stabilized by addition of an amount of ammonia as further preservative of 0.35% w/w or more on total latex may be deammoniated, for example by using known means like blowing air onto the surface of the latex, to an ammonia concentration of 0.35% w/w or less, typically 0.2% w/w, and then treated with 0.20% to 1.50% w/w (% w/w on total amount of dry rubber) of a hydrophobically modified saccharide, optionally in solid form (for example in spray-dried powder form) or in the form of a suspension (for example in suspension in aqueous medium), under stirring of the mixture to ensure homogenisation.

The preserved rubber latex of the invention presents a good stability, namely a stability enabling the concentration of the latex by centrifugation or by creaming optionally followed by a centrifugation, without coagulation of the latex during these process steps. Furthermore, the concentrated latex according to the invention remains stable, presenting neither coagulation nor putrefaction, during prolonged storage for a period that may be up to 20 weeks or even more.

Furthermore, the stabilization of natural rubber latex by the method of the present invention does not significantly negatively affect subsequent processing of the preserved latex or the concentrated preserved latex or the quality and properties of shaped rubber articles manufactured from the stabilized latex.

The preparation of shaped rubber articles starting from a (concentrated) natural rubber latex is as such well-known, and typically involves a step known as vulcanisation. It is also well-known that usually compounds other than the already mentioned hydrophobically modified saccharide and the optional further preservative are added to the latex. Within the framework of the present invention, compounds added to the latex other than the hydrophobically modified saccharide are referred to as additives. Some of these additives are themselves hydrophobic, such as for example certain accelerators; others are hydrophilic. Some additives are added to the latex in the form of an emulsion or a dispersion. The invention thus also relates to a method wherein at least one aqueous dispersion of an additive is added to the natural rubber latex. In this method, the said dispersion contains at least one hydrophobically modified saccharide. An advantage of this method is that the additive, which is preferably a hydrophobic substance, is added to the natural rubber latex in a very efficient fashion, contributing to a quick availability for further use such as a desired chemical reaction; this in turn can lead to improved properties of the final shaped natural rubber product. The hydrophobically modified saccharide that is suitable for use in this method according to the invention may be different from, but is preferably the same as those described above for the preservation of natural rubber latex. The dispersion to be added to the latex may according to the invention contain one additive, but it may also contain more than one additive; also, it is according to the invention possible to add more than one dispersion of one or more additives, whereby one or more or all of the dispersions contain a hydrophobically modified saccharide.

In a particularly preferred embodiment, the additive that is to be added to the natural rubber latex is an accelerator, which is dispersed in an aqueous phase to form a dispersion, whereby a hydrophobically modified saccharide, preferably of formula (I), is added in an amount varying between 0.1% w/w and 20% w/w on total dispersion. Preferably, the accelerator is hydrophobic. A preferred example of the accelerator is zinc dibutyldithiocarbamate (ZDBC); other accelerators or other—preferably hydrophobic—additives for use in natural rubber latex, however, are also suitable in the method of the invention.

It is not compulsory that the method of adding an additive to a natural rubber latex according to the invention is combined with the method of preservation of a natural rubber latex according to the invention; it may, however, be beneficial to do so.

The invention has as further objective to provide shaped natural rubber products. This further objective is achieved in that a natural rubber latex, possibly concentrated, is combined with additives such as accelerators, whereby at least one of such additives may be in the form of an aqueous dispersion. The latex is then vulcanised and subsequently formed into a desired shape; the steps of vulcanising and subsequent forming into a desired shape may be done according to known practices. According to the invention, a hydrophobically modified saccharide is used in preserving the (concentrated) natural latex and/or is part of the said additive-containing aqueous dispersion. Consequently, the shaped natural rubber product of the invention—which may be for example a glove—comprises a hydrophobically modified saccharide.

The invention is illustrated by the following examples, without being limited thereto.

EXAMPLE 1

The mechanical stability of natural rubber latex treated by the method of the invention is tested according to ISO 35 procedure by subjecting the required amount of latex mixture stabilized by 0.2% w/w on total latex ammonia and by an amount from 0.25% to 1.0% w/w on dry rubber of Inutec® SP1 (Trade mark of Orafti, Belgium for inulin laurylcarbamate) to centrifugal forces, and measuring the time the dispersion remains stable (indicated as Mechanical Stability Time (MST), expressed in seconds). The end point of the stability is indicated by the first appearance of flocculum. The results are indicated in Table 2 below.

TABLE 2

Mechanical stability of preserved rubber latex

| LA Latex[1] + % w/w SP1[2] | Storage time (weeks) | | | | |
|---|---|---|---|---|---|
| | 2 | 4 | 6 | 8 | 16 |
| | Mechanical Stability Time (MST) (in seconds)[3] | | | | |
| LA + 0.00* | 1350 | 1500 | 1591 | 1604 | 1453 |
| LA + 0.25 | 2020 | 2018 | 1862 | 1941 | 1670 |
| LA + 0.50 | 2133 | 2317 | 2189 | 2276 | 1723 |
| LA + 0.75 | 2850 | 2849 | 2850 | 2865 | 1998 |
| LA + 1.0 | 3600 | 3600 | 3600 | 3600 | 2480 |

Legend to Table 2
[1] LA latex: natural rubber latex treated with 0.2% w/w ammonia
[2] SP1: Inutec ® SP1 (trade name of Orafti, Belgium, for inulin laurylcarbamate); % w/w on dry rubber
[3] MST in seconds at 14,000 rpm in a centrifuge according to ISO 35
*comparative experiment From Table 2 it can easily be seen that the presence of SP1 in LA latex leads to a significant increase in MST.

EXAMPLE 2

As indicated earlier, microbial infection of natural rubber latex results in the formation of acidic compounds, particularly volatile fatty acids (VFA's), and an increase of VFA's in the latex thus indicates a decline in the colloidal stability of the latex dispersion.

In order to assess the colloidal stability of rubber latex, a test is used in the art according to which the evolution of the concentration of volatile fatty acids (expressed as volatile fatty acid number (VFA No)) in a rubber latex is determined as a function of time. VFA No is defined as the number in grams of potassium hydroxide equivalent to the anions present as salts of steam volatile acids in a quantity of latex which contains 100 g of total solids. The lower the VFA No, the more stable the dispersion.

In example 2, the colloidal stability of natural rubber latex stabilized by the method of the invention is tested according to ISO 506 procedure, by measuring on the required amount of latex stabilized by 0.2% w/w on total latex ammonia and by an amount ranging from 0.25% to 1.0% w/w on dry rubber of Inutec® SP1 (Trade mark of Orafti, Belgium, for inulin lauryl-carbamate), the evolution of the VFA number in function of the time and of the concentration of the hydrophobically modified saccharide of formula (I). The results are indicated in Table 3 below.

TABLE 3

Colloidal stability of preserved rubber latex

| LA Latex[1] + % w/w SP1[2] | Storage time (weeks) | | | | |
|---|---|---|---|---|---|
| | 2 | 4 | 6 | 8 | 16 |
| | Volatile fatty acid number (VFA No)[3] | | | | |
| LA + 0.00* | 0.058 | 0.058 | 0.070 | 0.085 | 0.140 |
| LA + 0.25 | 0.057 | 0.063 | 0.071 | 0.083 | 0.110 |
| LA + 0.50 | 0.057 | 0.065 | 0.076 | 0.091 | 0.118 |
| LA + 0.75 | 0.062 | 0.065 | 0.080 | 0.100 | 0.124 |
| LA + 1.0 | 0.065 | 0.075 | 0.075 | 0.088 | 0.126 |

Legend to Table 3
[1] LA latex: natural rubber latex treated with 0.2% w/w ammonia
[2] SP1: Inutec ® SP1 (trade name of Orafti, Belgium, for inulin laurylcarbamate); % w/w on dry rubber
[3] VFA No according to ISO 506 procedure
*Comparative experiment Table 3 demonstrates that the presence of SP1 does not lead to a significant increase of the VFA No compared to the latex without SP1, indicating that any microbial infection is not accelerated through the presence of the hydrophobically modified saccharide.

EXAMPLE 3

In a subsequent separate test series, the effects on the mechanical stability and colloidal stability of three further hydrophobically modified saccharides on natural rubber latex was evaluated. The three further compounds were compounds #12, 17 and 25 as identified in Table 1 above. The test methods were the same as in Examples 1 and 2; thus, also here the parameters that were determined were MST and VFA No. Also, as in Examples 1 and 2, a control latex not according to the invention was co-evaluated; the control latex was also in this case a low-ammonia (LA) latex treated with 0.2% ammonia. The three further hydrophobically modified saccharides were added in two weight percentages: 0.5 or 0.75%. The results are given in the tables below.

TABLE 4

Colloidal stability

| Latex composition | VFA No | | | | |
|---|---|---|---|---|---|
| | | After ... month(s) | | | |
| | Initial | 1 | 2 | 3 | 4 |
| LA + 0.00* | 0.037 | 0.041 | 0.053 | 0.054 | 0.057 |
| LA + #12 (0.50%) | 0.037 | 0.037 | 0.040 | 0.052 | 0.049 |
| LA + #17 (0.50%) | 0.037 | 0.037 | 0.037 | 0.043 | 0.055 |
| LA + #25 (0.50%) | 0.037 | 0.033 | 0.041 | 0.049 | 0.052 |

*Comparative experiment

TABLE 5

Colloidal stability

| Latex composition | VFA No | | | | |
|---|---|---|---|---|---|
| | | After ... month(s) | | | |
| | Initial | 1 | 2 | 3 | 4 |
| LA + 0.00* | 0.037 | 0.041 | 0.053 | 0.054 | 0.057 |
| LA + #12 (0.75%) | 0.037 | 0.030 | 0.044 | 0.048 | 0.047 |
| LA + #17 (0.75%) | 0.037 | 0.033 | 0.040 | 0.049 | 0.054 |
| LA + #25 (0.75%) | 0.037 | 0.039 | 0.040 | 0.049 | 0.059 |

*Comparative experiment

TABLE 6

Mechanical Stability [0.50%]

| Latex composition | MST | | | | |
|---|---|---|---|---|---|
| | | After ... month(s) | | | |
| | Initial | 1 | 2 | 3 | 4 |
| LA + 0.00* | 1469 | 1026 | 1098 | 1326 | 1566 |
| LA + #12 (0.50%) | 1469 | 1494 | 1644 | 1734 | 1872 |
| LA + #17 (0.50%) | 1469 | 1644 | 1812 | 1968 | 1818 |
| LA + #25 (0.50%) | 1469 | 1638 | 1836 | 2100 | 2418 |

*Comparative experiment

TABLE 7

Mechanical Stability

| Latex composition | MST | | | | |
|---|---|---|---|---|---|
| | Initial | After . . . month(s) | | | |
| | | 1 | 2 | 3 | 4 |
| LA + 0.00* | 1469 | 1026 | 1098 | 1326 | 1566 |
| LA + #12 (0.75%) | 1469 | 1709 | 1940 | 2100 | 1992 |
| LA + #17 (0.75%) | 1469 | 1668 | 2299 | 2522 | 2555 |
| LA + #25 (0.75%) | 1469 | 1878 | 2303 | 2284 | 2406 |

*Comparative experiment

The results in Tables 4, 5, 6, and 7 clearly show the superior stability of the latex according to the invention as compared to a LA latex.

EXAMPLE 4

In Example 4, the properties of a shaped natural rubber product are investigated in relation to the addition of various forms of a dispersion of the accelerator ZDBC, added to a high-ammonia (HA) latex. The overall composition of the rubber is given in Table 8; the various ways in which the accelerator ZDBC was provided are given in Table 9.

TABLE 8 overall composition

| Compound (% w/w of aqueous dispersion) | Dry weight (g) | Actual weight (g) |
|---|---|---|
| HA Latex (60%) | 100 | 167 |
| Potassium laurate (20%) | 0.2 | 1 |
| Potassium hydroxide (10%) | 0.3 | 3 |
| Sulphur (50%) | 0.7 | 1.4 |
| ZDBC (50%) | 0.75 | 1.5 |
| ZnO (50%) | 0.25 | 0.5 |
| Wingstay L$^{(1)}$ (50%) | 0.25 | 0.5 |

$^{(1)}$Wingstay L is an antioxidant (reaction product of para-cresol & dicyclopentadiene).

As given in Table 8, the accelerator ZDBC was added in the form of a 50% w/w aqueous system. This was done in three different formulations. The three formulations are given below in Table 9. All formulations were prepared in a mill of the rotating cylinder type via the Ball Mill method. The balls were a mixture of balls having a diameter of 0.5, 0.75 and 1 inch. The duration of milling was 48 hours; the speed of rotating was 70 rpm.

TABLE 9

Formulations used for preparing ZDBC dispersion

| Chemical | Formulation | | |
|---|---|---|---|
| | 1* | 2* | 3 |
| | Amount added (g) | | |
| ZDBC | 50 | 50 | 50 |
| Anchoid$^{(1)}$ | 2 | 1 | 1 |
| Ammonium caseinate$^{\#}$ | — | 10 | — |
| INUTEC SP1$^{\#}$ | — | — | 10 |
| Water | 48 | 39 | 39 |
| Total | 100 | 100 | 100 |

Legend to Table 9:
$^{(1)}$Anchoid is a condensation product of naphthalene-2-sulphonic acid and formaldehyde
*Comparative experiment
$^{\#}$10% w/w in water The sedimentation rates of the three ZDBC formulations were tested; this was done by carefully pouring 100 ml of dispersion into a volumetric cylinder, and then measuring the reduction in volume of the top surface of the dispersion with time for 5 days. The reduction in volume versus time graph was plotted next and the slope was taken as the sedimentation rate of the dispersion. The sedimentation rates and were found to be 1.49 for formulation 1, 0.41 for formulation 2, and 0.50 for formulation 3. This confirmed the stabilizing action of Inutec SP1 in the formulation according to the invention.

The HA Latex compositions were converted into rubber films. Certain properties of these films were measured, as detailed below in Table 10. The ageing as referred to in Table 10 was done at 70° C. during 7 days.

TABLE 10

Properties of rubber films

| Formulation | 1* | 2* | 3 |
|---|---|---|---|
| Modulus M700 before aging | 10416 | 10080 | 11391 |
| Modulus M700 after aging | 4409 | 4159 | 4545 |
| Elongation at break before ageing (%) | 852 | 854 | 844 |
| Elongation at break after ageing (%) | 970 | 950 | 950 |
| Tear strength before ageing (N/mm) | 14.81 | 18.42 | 21.44 |
| Tear Strength after ageing (N/mm) | 7.40 | 7.17 | 8.18 |

*= Comparative experiment

Table 10 clearly shows that the film according to the invention has improved tear strength compared to the known films, and that this improvement is achieved without deterioration of modulus or elongation at break.

In this Example 4, an embodiment of the present invention was used in which the hydrophobically modified saccharide was contained in the dispersion containing an additive that was added to the natural rubber latex but not otherwise added, e.g. in order to preserve the latex. It is quite possible according to the invention however to alter this embodiment by also adding a hydrophobically modified saccharide to the latex, e.g. within a short time after obtaining the latex and with the aim or preserving it.

The invention claimed is:

1. A method for the preservation of natural rubber latex, comprising adding to natural rubber latex at least one hydrophobically modified saccharide, wherein the hydrophobically modified saccharide is a hydrophobically modified fructan, a starch hydrolysate derivative, or mixtures thereof, whereby the starch hydrolysate derivate has formula [B](-M)s, wherein

[B] represents a starch hydrolysate moiety with a dextrose equivalent (D.E.) value ranging from 2 to 47, (-M) represents a hydrophobic moiety, substituting at least one hydrogen atom of a hydroxyl group of [B], wherein (-M) is selected from the group consisting of:

an alkylcarbamoyl radical of formula R1-NH—CO—, an alkenyl-carbamoyl radical of formula R2-NH—CO—, an alkylcarbonyl radical of formula R1-CO—, an alkenylcarbonyl radical of formula R2-CO—,
an alkyl radical of formula R1-,
an alkenyl radical of formula R2-, and
a hydroxyalkyl radical of formula R3-,
wherein:
R1 represents a linear or branched alkyl group with 4 to 22 carbon atoms,
R2 represents a linear or branched alkenyl group with 4 to 22 carbon atoms,
R3 represents a linear or branched hydroxyalkyl group with 4 to 22 carbon atoms of formula —CHR'—CHOH—R", wherein R' is hydrogen or a linear or branched alkyl radical containing 2 to 20 carbon atoms; and R" is a linear or branched alkyl radical containing 2 to 20 carbon atoms; and
s represents the number of hydrophobic moieties (-M) attached to [B], expressed as the number average degree of substitution (av. DS) per individual fructosyl and/or glucosyl unit and ranging from 0.01 to 2.0.

2. The method according to claim 1, wherein the hydrophobically modified fructan has formula [A]n(-M)s, wherein
[A]n represents an inulin moiety with a degree of polymerisation (DP) ranging from 3 to 100,
(-M) represents a hydrophobic moiety, substituting at least one hydrogen atom of a hydroxyl group of [A]n, wherein (-M) is selected from the group consisting of:
an alkylcarbamoyl radical of formula R1-NH—CO—,
an alkenyl-carbamoyl radical of formula R2-NH—CO—,
an alkylcarbonyl radical of formula R1-CO—,
an alkenylcarbonyl radical of formula R2-CO—,
an alkyl radical of formula R1-,
an alkenyl radical of formula R2-, and
a hydroxyalkyl radical of formula R3-,
wherein:
R1 represents a linear or branched alkyl group with 4 to 22 carbon atoms,
R2 represents a linear or branched alkenyl group with 4 to 22 carbon atoms,
R3 represents a linear or branched hydroxyalkyl group with 4 to 22 carbon atoms of formula —CHR'—CHOH—R", wherein R' is hydrogen or a linear or branched alkyl radical containing 2 to 20 carbon atoms; and R" is a linear or branched alkyl radical containing 2 to 20 carbon atoms; and
s represents the number of hydrophobic moieties (-M) attached to [A]n, expressed as the number average degree of substitution (av. DS) per individual fructosyl and/or glucosyl unit and ranging from 0.01 to 2.0.

3. A method according to claim 1, wherein furthermore at least one further preservative is added to the natural rubber latex.

4. The method according to claim 2, wherein furthermore at least one further preservative is added to the natural rubber latex.

5. The method according to claim 1, wherein at least one aqueous dispersion of an additive is added to the natural rubber latex, whereby the said dispersion contains at least one hydrophobically modified saccharide.

6. The method according to claim 2, wherein at least one aqueous dispersion of an additive is added to the natural rubber latex, whereby the said dispersion contains at least one hydrophobically modified saccharide.

7. The method according to claim 3, wherein at least one aqueous dispersion of an additive is added to the natural rubber latex, whereby the said dispersion contains at least one hydrophobically modified saccharide.

8. The method according to claim 4, wherein at least one aqueous dispersion of an additive is added to the natural rubber latex, whereby the said dispersion contains at least one hydrophobically modified saccharide.

9. The method according to claim 5, wherein the at least one hydrophobically modified saccharide contained in the aqueous dispersion is a hydrophobically modified fructan a hydrophobically modified starch hydrolysate, or a mixture thereof, and wherein the aqueous dispersion is a dispersion of a hydrophobic substance.

10. The method according to claim 6, wherein the at least one hydrophobically modified saccharide contained in the aqueous dispersion is a hydrophobically modified fructan, a hydrophobically modified starch hydrolysate, or a mixture thereof, and wherein the aqueous dispersion is a dispersion of a hydrophobic substance.

11. The method according to claim 7, wherein the at least one hydrophobically modified saccharide contained in the aqueous dispersion is a hydrophobically modified fructan, a hydrophobically modified starch hydrolysate, or a mixture thereof, and wherein the aqueous dispersion is a dispersion of a hydrophobic substance.

12. The method according to claim 8, wherein the at least one hydrophobically modified saccharide contained in the aqueous dispersion is a hydrophobically modified fructan, a hydrophobically modified starch hydrolysate, or a mixture thereof, and wherein the aqueous dispersion is a dispersion of a hydrophobic substance.

13. The method according to claim 5, wherein the aqueous dispersion of a hydrophobic substance contains zinc dibutyldithiocarbamate (ZDBC).

14. The method according to claim 6, wherein the aqueous dispersion of a hydrophobic substance contains zinc dibutyldithiocarbamate (ZDBC).

15. The method according to claim 7, wherein the aqueous dispersion of a hydrophobic substance contains zinc dibutyldithiocarbamate (ZDBC).

16. The method according to claim 8, wherein the aqueous dispersion of a hydrophobic substance contains zinc dibutyldithiocarbamate (ZDBC).

17. A natural rubber latex, containing a hydrophobically modified fructan, a starch hydrolysate derivative according to formula [B](-M)s, or mixtures thereof, wherein
[B] represents a starch hydrolysate moiety with a dextrose equivalent (D.E.) value ranging from 2 to 47,
(-M) represents a hydrophobic moiety, substituting at least one hydrogen atom of a hydroxyl group of [B], wherein (-M) is selected from the group consisting of:
an alkylcarbamoyl radical of formula R1-NH—CO—,
an alkenyl-carbamoyl radical of formula R2-NH—CO—,
an alkylcarbonyl radical of formula R1-CO—,
an alkenylcarbonyl radical of formula R2-CO—,
an alkyl radical of formula R1-,
an alkenyl radical of formula R2-, and
a hydroxyalkyl radical of formula R3-,
wherein:
R1 represents a linear or branched alkyl group with 4 to 22 carbon atoms,
R2 represents a linear or branched alkenyl group with 4 to 22 carbon atoms,
R3 represents a linear or branched hydroxyalkyl group with 4 to 22 carbon atoms of formula —CHR'—CHOH—R", wherein R' is hydrogen or a linear or branched alkyl radical containing 2 to 20 carbon atoms; and R" is a linear or branched alkyl radical containing 2 to 20 carbon atoms; and s represents the number of hydrophobic moieties (-M) attached to [B], expressed as the number average degree of substitution (av. DS) per individual fructosyl and/or glucosyl unit and ranging from 0.01 to 2.0.

18. A vulcanised natural rubber product, containing a hydrophobically modified fructan, a starch hydrolysate derivative according to formula [B](-M)s, or mixtures thereof, wherein
   [B] represents a starch hydrolysate moiety with a dextrose equivalent (D.E.) value ranging from 2 to 47,
   (-M) represents a hydrophobic moiety, substituting at least one hydrogen atom of a hydroxyl group of [B], wherein (-M) is selected from the group consisting of:
   an alkylcarbamoyl radical of formula R1-NH—CO—,
   an alkenyl-carbamoyl radical of formula R2-NH—CO—,
   an alkylcarbonyl radical of formula R1-CO—,
   an alkenylcarbonyl radical of formula R2-CO—,
   an alkyl radical of formula R1-,
   an alkenyl radical of formula R2-, and
   a hydroxyalkyl radical of formula R3-,
   wherein:
   R1 represents a linear or branched alkyl group with 4 to 22 carbon atoms,
   R2 represents a linear or branched alkenyl group with 4 to 22 carbon atoms,
   R3 represents a linear or branched hydroxyalkyl group with 4 to 22 carbon atoms of formula —CHR'—CHOH—R", wherein R' is hydrogen or a linear or branched alkyl radical containing 2 to 20 carbon atoms; and R" is a linear or branched alkyl radical containing 2 to 20 carbon atoms; and
   s represents the number of hydrophobic moieties (-M) attached to [B], expressed as the number average degree of substitution (av. DS) per individual fructosyl and/or glucosyl unit and ranging from 0.01 to 2.0.

* * * * *

UNITED STATES PATENT AND TRADEMARK OFFICE
CERTIFICATE OF CORRECTION

| | | |
|---|---|---|
| PATENT NO. | : 7,989,546 B2 | Page 1 of 1 |
| APPLICATION NO. | : 12/530434 | |
| DATED | : August 2, 2011 | |
| INVENTOR(S) | : Booten et al. | |

It is certified that error appears in the above-identified patent and that said Letters Patent is hereby corrected as shown below:

Claim 9, Col. 18, line 7 "fructan a" should be --fructan, a--.

Signed and Sealed this
Eighteenth Day of December, 2012

David J. Kappos
*Director of the United States Patent and Trademark Office*